(12) United States Patent
Toudou et al.

(10) Patent No.: US 9,417,135 B2
(45) Date of Patent: Aug. 16, 2016

(54) TEMPERATURE SENSOR

(71) Applicant: DENSO CORPORATION, Kariya, Aichi-pref. (JP)

(72) Inventors: Yuusuke Toudou, Kariya (JP); Tsunenobu Hori, Kariya (JP); Sotoo Takahashi, Okazaki (JP)

(73) Assignee: DENSO CORPORATION, Kariya (JP)

( * ) Notice: Subject to any disclaimer, the term of this patent is extended or adjusted under 35 U.S.C. 154(b) by 503 days.

(21) Appl. No.: 13/788,473

(22) Filed: Mar. 7, 2013

(65) Prior Publication Data
US 2013/0235904 A1  Sep. 12, 2013

(30) Foreign Application Priority Data

Mar. 6, 2012 (JP) ................. 2012-049682

(51) Int. Cl.
*G01K 7/00* (2006.01)
*G01K 7/16* (2006.01)

(52) U.S. Cl.
CPC ............ *G01K 7/16* (2013.01); *G01K 2007/163* (2013.01); *G01K 2205/04* (2013.01)

(58) Field of Classification Search
CPC  G01K 7/16; G01K 2205/04; G01K 2007/163
See application file for complete search history.

(56) References Cited

U.S. PATENT DOCUMENTS 4,029,472 A * 6/1977 Micheli .................... G01K 7/04
   136/201
2008/0205484 A1  8/2008 Toudou et al.
2009/0147826 A1 * 6/2009 Suzuki et al. ................. 374/208
2009/0323765 A1  12/2009 Yokoi et al.
2010/0091817 A1 * 4/2010 Wienand et al. ............ 374/185
2012/0055909 A1  3/2012 Miyake et al.

FOREIGN PATENT DOCUMENTS

JP  4-279289  10/1992
JP  6-201487  7/1994
(Continued)

OTHER PUBLICATIONS

Office Action (5 pgs.) dated Nov. 22, 2013 issued in corresponding Japanese Application No. 2012-049682 with an at least partial English-language translation thereof (7 pgs.).
(Continued)

*Primary Examiner* — Lisa Caputo
*Assistant Examiner* — Janice M Soto
(74) *Attorney, Agent, or Firm* — Nixon & Vanderhye P.C.

(57) ABSTRACT

The temperature sensor includes a thermo-sensitive element, first and second electrode wires electrically connected to the thermo-sensitive element, first and second signal wires partially overlapped with and connected to the first and second electrode wires, respectively. The first and second electrode wires are made of a first metal material consisting primarily of Pt. The first and second signal wires are made of a second metal material containing Al and having a linear thermal expansion coefficient larger than that of the first metal material. Each of an overlap portion of the first electrode wire and the first signal wire and an overlap portion of the second electrode wire and the second signal wire includes a junction part formed by melting and thereafter coagulating the first or second electrode wire and the first or second signal wire. The junction part includes an oxidation film containing Al formed on a surface thereof.

5 Claims, 9 Drawing Sheets

(56) References Cited

FOREIGN PATENT DOCUMENTS

| | | | |
|---|---|---|---|
| JP | H06201487 | * | 7/1994 |
| JP | 2004-301679 | | 10/2004 |
| JP | 2008-209267 | | 9/2008 |
| JP | 2008-215919 | | 9/2008 |
| JP | 2009-258082 | | 11/2009 |
| JP | 2009-294107 | | 12/2009 |
| JP | 2009294107 | * | 12/2009 |
| JP | 2010-32493 | | 2/2010 |
| JP | 2011-2354 | | 1/2011 |
| JP | 2012-13629 | | 1/2012 |
| WO | 2010/131298 | | 11/2010 |

OTHER PUBLICATIONS

Information Offer Form (9 pages) dated May 15, 2014 issued in corresponding Japanese Application No. 2012-049682 and English translation (9 pages).

* cited by examiner

| | INITIAL STATE | AFTER ENDURANCE TEST (ENDURANCE CONDITION 1) |
|---|---|---|
| (a) X-RAY PHOTOGRAPH |  |  |
| (b) PHOTOGRAPH OF APPEARANCE |  | |
| (c) PHOTOGRAPH OF CROSS SECTION |  | |

TEMPERATURE SENSOR

This application claims priority to Japanese Patent Application No. 2012-49682 filed on Mar. 6, 2012, the entire contents of which are hereby incorporated by reference.

BACKGROUND OF THE INVENTION

1. Field of the Invention

The present invention relates to a temperature sensor.

2. Description of Related Art

It is known to detect the temperature of exhaust gas of an automobile using a temperature sensor having a thermo-sensitive element such as a thermistor element whose resistance varies depending on the ambient temperature. Such temperature sensors include ones that have a thermo-sensitive element, electrode wires connected to the thermo-sensitive element, signal wires connected to the electrode wires, and a sheath pin accommodating the signal wires in a state where the signal wires are exposed from the sheath pin at their front ends. Commonly, Pt is used as a material of the electrode wire, and SUS310S is used as a material of the signal wire.

Meanwhile, it is proposed to dispose an intermediate layer between the electrode wire and the signal wire. For example, Japanese Patent Application Laid-open No. 2009-294107 discloses a temperature sensor having the structure in which an intermediate member having a thermal expansion coefficient in between the thermal expansion coefficient of an electrode wire and the thermal expansion coefficient of a signal wire is disposed in an overlap portion between the electrode wire and the signal wire, and the intermediate member and its vicinity are laser-welded to form an intermediate layer.

However, the above temperature sensor is not suitable for use of detecting a wide temperature range, for example, a temperature range from around −40° C. to +1000° C. because of the following reason. In the temperature sensor using Pt as a material of the electrode wire and SUS310S as a material of the signal wire, the difference between the thermal expansion coefficient of the electrode wire and the thermal expansion coefficient of the signal wire is large. Accordingly, the thermal stress in a junction part between the electrode wire and the signal wire increases with the increase of the temperature difference between the hot state and cold state in use. Hence, the electrode wire which is weaker in material strength than that of the signal wire is likely to break. This problem becomes conspicuous particularly in an environment where the temperature sensor is repeatedly subjected to a hot and cold cycle.

Incidentally, in the temperature sensor described in the above patent document, the intermediate layer is formed by disposing the intermediate member having a thermal expansion coefficient in between the thermal expansion coefficient of the electrode wire and the thermal expansion coefficient of the signal wire. However, it is difficult to completely prevent breakage of the electrode wire by using such a structure, because the intermediate layer and the signal wire are likely to be oxidized.

SUMMARY

According to an exemplary embodiment, there is provided a temperature sensor including:

a thermo-sensitive element whose electrical characteristics vary depending on ambient temperature;

first and second electrode wires electrically connected to the thermo-sensitive element;

first and second signal wires at least partially overlapped with and connected to the first and second electrode wires, respectively; and a sheath pin accommodating the first and second signal wires in a state that front portions of the first and second signal wires are exposed from the sheath pin;

wherein the first and second electrode wires are made of a first metal material consisting primarily of Pt, the first and second signal wires are made of a second metal material containing Al and having a linear thermal expansion coefficient larger than a linear thermal expansion coefficient of the first metal material, each of an overlap portion of the first electrode wire and the first signal wire and an overlap portion of the second electrode wire and the second signal wire includes a junction part formed by melting and thereafter coagulating the first or second electrode wire and the first or second signal wire, and the junction part includes a first oxidation film containing Al formed on a surface thereof.

According to the exemplary embodiment, there is provided a temperature sensor including electrode wires connected to a thermo-sensitive elements and signal wires connected to the electrode wires, which exhibits high resistance to breakage of the electrode wires even when subjected to repetition of a hot and cold cycle.

Other advantages and features of the invention will become apparent from the following description including the drawings and claims.

PREFERRED EMBODIMENTS OF THE INVENTION

Figure 1:
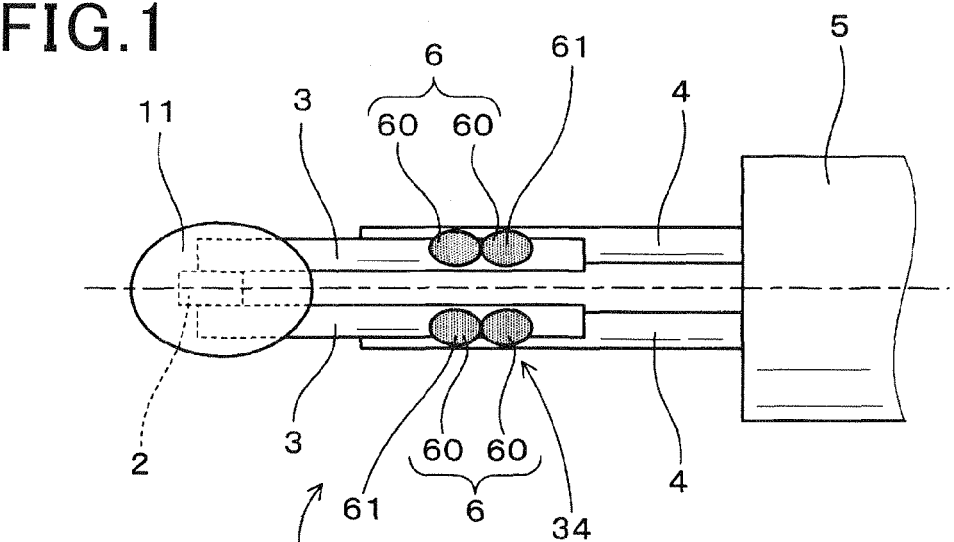
FIG. 1 is a plan view of a front part of a temperature sensor according to a first embodiment of the invention.
Figure 2:
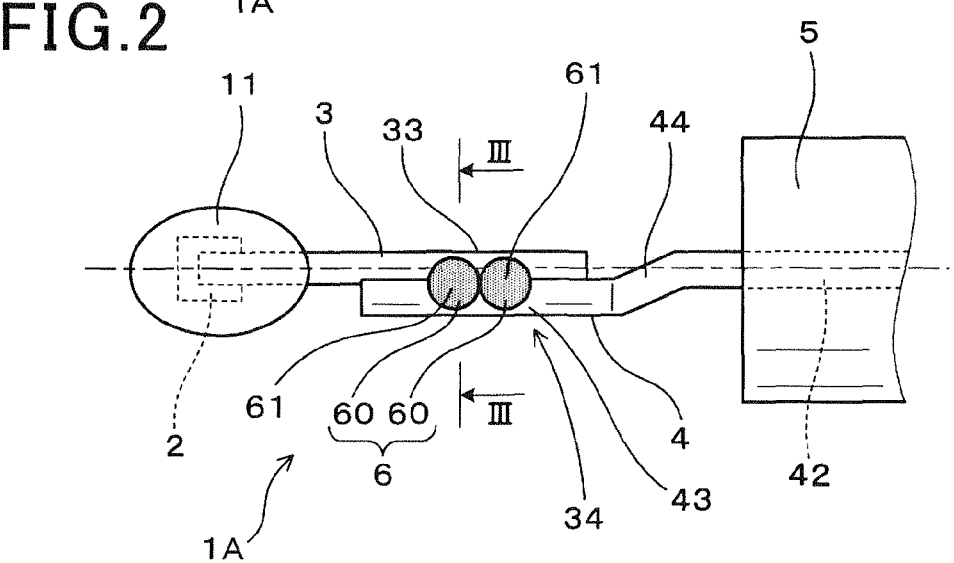
FIG. 2 is a side view of the front part of the temperature sensor according to the first embodiment of the invention.

Prior to describing various embodiments of the invention, matters common to the various embodiments are explained.

Each of temperature sensors according to the embodiments of the invention can be inserted into and fixed to an exhaust pipe to measure the temperature of exhaust gas emitted from an internal combustion engine. In these embodiments, one side of the temperature sensor from which it is inserted into an exhaust pipe or the like, that is, the side on which a thermo-sensitive element is disposed is referred to as the front side, and the opposite side is referred to as the rear side. The thermo-sensitive element of each temperature sensor may be a thermistor element whose electrical resistance varies depending on the ambient temperature Electrode wires of each temperature sensor are made of a metal material consisting primarily of Pt. Here, "consisting primarily of Pt" means "contains 50 mass % or more of Pt". This metal material may be a Pt-alloy containing Pt and other kinds of alloy components, or Pt plated with Au. The other kinds of alloy components may be platinum group metals such as Rh, Ir, Pd, Ru, Os, or may be Ni or W. This metal material may contain one or more of these alloy components. Pt or Pt-alloy used as a material of the electrode wire may contain impurities unremovable during a manufacturing process. The content of the other kind of alloy components (s) can be determined taking into account of necessary strength, workability, and kinds of additional elements.

The linear thermal expansion coefficient of the metal material of the electrode wire is preferably in a range of 7 to $11 \times 10^{-6}$ (1/° C.), and more preferably in a range of 8 to $10 \times 10^{-6}$ (1/° C.). Here, the term "linear thermal expansion coefficient" is pursuant to JIS Z2285 (Measuring method of coefficient of linear thermal expansion of metallic materials). The linear thermal expansion coefficient is measured by a constant-temperature measuring method using a thermomechanical analyzer set to the temperature of 1000° C. The cross-sectional shape of the electrode wire is not limited to any specific shape. It may be an approximately circular shape. The diameter of the electrode may be in a range of 0.1 to 0.4 mm The signal wire is made of a metal material containing Al. The Al contained in the signal wire is an important element necessary for forming later-described first and second oxide films. As the metal material containing Al, a NI-based alloy containing Al, or Fe—Cr-based alloy containing Al may be used. The reason is as follows.

In conventional temperature sensors, the signal wire is made of SUS310 or the like. In this case, if the temperature sensor is subjected to a hot and cold cycle repeatedly, oxidation develops in the signal wire or the junction part, as a result of which an oxide film consisting primarily of chromium oxide is formed on the surface of the signal wire and the junction part. This Cr-based oxide film has a low linear thermal expansion coefficient, and furthermore is weak. Accordingly, the oxide film is likely to flake off from the signal wire causing the cross-sectional area or diameter of the signal wire to reduce when the temperature sensor is subjected to a hot and cold cycle repeatedly. Reduction of the diameter of the signal wire reduces the strength of the signal wire, as a result of which the signal wire is easily plastic-deformed causing the thermal stress applied to the junction part to increase. Consequently, the electrode wire becomes likely to break.

In contrast, if the signal wire is made of the metal material containing Al, the resistance to oxidation of the signal wire increases. Accordingly, in this case, even when the temperature sensor is subjected to a hot and cold cycle repeatedly, since the surface of the signal wire is unlikely to be oxidized, and reduction of the cross-sectional area of the signal wire due to flaking off of the oxide film is unlikely to occur, it is possible to suppress the plastic deformation due to reduction of the diameter of the signal wire. Consequently, it is possible to suppress increase of the thermal stress applied to the junction part and more reliably prevent breakage of the electrode wire. This advantage is great particularly when the signal wire is made of a Ni-based alloy containing Al. In addition, in this case, since workability of the sheath pin for accommodating signal wires is good, manufacturability can be improved compared to the case where the signal wire is made of the Fe—Cr-based alloy containing Al.

As the Ni-based alloy containing Al, INCONEL (registered trademark by Special Metals Corporation) 601 or 617 may be used. The Fe—Cr-based alloy, which is an alloy composed mostly of Fe and Cr and added with Al, may contain alloy elements other than Fe, Cr and Al. As the Fe—Cr-based alloy containing AL may be ferrite-based stainless steel containing Al. In view of resistance to oxidation, the content of Al of the metal material containing Al is preferably 0.2 mass % or more, and more preferably 1.0 mass % or more. In view of workability, the content of Al is preferably 5.0 mass % or less, and more preferably 3.0 mass % or less.

The metal material of the signal wire has a linear thermal expansion coefficient larger than that of the material of the electrode wire. The shape of the cross-section of the signal wire is not limited to any specific shape. It may be an approximately circular shape. In this case, the diameter of the signal wire may be in a range of 0.2 to 0.5 mm.

The overlap portion between the electrode wire and the signal wire can be constituted by overlapping a certain area of the electrode wire on the rear side and a certain area of the signal wire on the front side such that the electrode wire and the signal are axially in parallel with each other. The axial length of the overlap portion is not limited to any specific length. It may be in a range of 0.3 to 0.8 mm.

A straight line joining the axial center of one of the electrode wires and the axial center of a corresponding one of the signal wires which are overlapped in one of the two overlapped portions in a cross section perpendicular to the axial direction may be or may not be parallel to a straight line joining the axial center of the other electrode wire and the axial center of the other signal wire which are overlapped in the other overlapped portion in cross section perpendicular to the axial direction. In the former case, since a laser beam can be applied to the overlapped portion in an oblique direction, a degree of flexibility in a laser welding process increases, as a result of which junction strength of the junction part can be increased more easily.

The junction part is formed by partially melting the electrode wire and the signal wire overlapped in the overlap portion, and thereafter coagulating the melted portion. Accordingly, the junction part is a mixture of the metal material of the electrode wire and the metal material of the signal wire. The junction part may be singular or divided into a plurality of junction portions. In the latter case, the plurality of the junction portions may be coupled with one another or separated from one another. In view of improving manufacturability, a formed area of the junction part located outside a straight line joining the axial centers of the electrode wire and the signal wire in a cross section perpendicular to the axial direction may be made larger than that located inside the straight line. A formed area of the junction part located on the side of the electrode wire may be the same or different from that located on the side of the signal wire. In view of controlling the linear thermal expansion coefficient of the junction part in a desirable range and reducing the difference between the linear thermal expansion coefficients of the junction part and the electrode wire, it is preferable that the formed area of the junction part located on the side of the electrode wire is larger than that located on the side of the signal wire.

It is preferable that the first oxide film covers substantially the whole of the surface of the junction part. The first oxide film can be formed by laser-welding the overlap portion between the electrode wire and the signal wire in an atmosphere containing oxygen, for example. Such atmosphere may be air or air added with nitrogen gas as an assist gas.

The thickness of the first oxide film is not limited to any specific value. However, in view of reducing the thermal stress applied to the junction part and increasing resistance to oxidation of the junction part, the thickness of the first oxide film is preferably in a range of 1 µm to 50 µm in its initial state before being subjected to a repetitive hot and cold cycle.

Part of the signal wire exposed from the sheath pin may include a second oxide film containing Al formed at its outer periphery to increase resistance to oxidation of the signal wire. This makes is possible to suppress reduction of the diameter of the signal wire and accordingly suppress plastic deformation of the signal wire. As a result, since the thermal stress applied to the junction part can be reduced, the electrode wire can be more reliably prevented from breaking. Incidentally, it is preferable that the second oxide film covers substantially the whole of the outer periphery of the part of the signal wire exposed from the sheath pin.

The thickness of the second oxide film is not limited to any specific value. However, in view of increasing resistance to oxidation of the signal wire, the thickness of the second oxide film is preferably in a range of 1 µm to 50 µm in its initial state before being subjected to the repetitive hot and cold cycle.

The first and second oxidation films may consist primarily of $Al_2O_3$. Here, "consist primarily of $Al_2O_3$" means "contain 50 mass or more of $Al_2O_3$."

In this case, since the film strength increases, the first and second oxide films are further unlikely to flake off even when subjected to a repetitive hot and cold cycle. Provision of the second oxide film suppresses plastic deformation of the signal wire due to reduction of its diameter. Accordingly, provision of the second oxide film makes it possible to suppress the thermal stress applied to the junction part and further reliably prevent breakage of the electrode wire.

The content of $Al_2O_3$ of each of the first and second oxide films is preferably 50 mass % or more, more preferably 70 mass % or more, and still more preferably 90 mass % or more. Incidentally, each of the first and second oxide films may contain an oxide other than $Al_2O_3$ if the above advantages are ensured. Such an oxide may be an oxide of a metal element contained in the metal material of the signal wire. For example, it may be an oxide of chromium.

The temperature sensor may include a cover disposed on the front end side of the sheath pin for covering the thermo-sensitive element, electrode wires and signal wires, and include a filler filled in the cover. In this case, since the filler fills the space between the inner wall of the cover and the thermo-sensitive element, electrode wires and signal wires, resistance to vibration can be increased.

The cover may be made of a metal material which may be a Ni-based alloy, or a Fe—Cr-based alloy. More specifically, the metal material may be INCONEL600, INCONEL601, or SUH21 (JIS G4312).

In this case, the electrode wires and the signal wires can be fixed to the cover through the filler. This fixation may be achieved by adhesion between the electrode wires and the signal wires, and adhesion between the filler and the cover. Further, this fixation may be achieved by friction contact between the electrode wires and signal wires, and friction contact between the filler and the cover.

In this case, the cover located at the outermost periphery is heated first and then cooled first. On the other hand, the electrode wires and the signal wires located inside the cover are hard to be heated and hard to be cooled after being heated compared to the cover, and, besides, restrained by the filler. Accordingly, the thermal stress applied to the junction part is likely to increase compared to the case where the filler is not present. This temperature sensor is resistant to breakage of the electrode wires under the above described severe thermal stress conditions.

The filler may consist primarily of $Al_2O_3$. Here, "consist primarily of $Al_2O_3$" means "contain 50 mass % or more of $Al_2O_3$."

This is advantageous in suppressing the thermal stress applied to the junction part to prevent breakage of the electrode wire, because the base of the first oxide film and the base of the second oxide film can be made the same.

The filler may be $Al_2O_3$ added with glass as a binder. The content of the binder can be determined taking into account a necessary strength and a necessary force to restrain the electrode wires. The content of the binder may be in a range of 2 to 10 mass %

The above temperature sensor can be manufactured by the following steps. A pair of the electrode wires made of metal material consisting primarily of Pt are electrically connected to the thermo-sensitive element. A certain area of the rear end of each of the two electrode wires connected to the thermo-sensitive element is contacted and overlapped on a corresponding one of the signal wires to form the overlap portion. A laser beam is applied to the overlap portion in an atmosphere containing oxygen to join the electrode wire and the signal wire together. The electrode wire and the signal wire are partially melted, and thereafter coagulated, as a result of which the junction part is formed. At this time, the first oxide film is formed on the surface of the junction part because of Al contained in the signal wire.

The second oxide film can be formed on the outer periphery of the signal wire by the following process. After the junction part is formed, the signal wire is heat-treated at a temperature from about 900° C. to 1000° C. in an atmosphere containing oxygen, for example, in the air. At this time, the second oxide film is formed on the outer periphery of the signal wire because of Al contained in the signal wire. The electrode wires, the signal wires and the cover can be made fixed to one another through the filler by the following method. A heat-hardening slurry filler material is put in the cover. Next, the overlap portion formed with the junction part is inserted into the filler material from the side of the thermo-sensitive element. Thereafter, the filler material is heat-treated at a temperature suitable for the filler material to be hardened in an atmosphere containing oxygen, for example, in the air. According to this method, the manufacturing process can be simplified because the fixation using the filler and formation of the second oxide film can be performed at the same time.

Next, various embodiments of the invention are described. In the below-described embodiments, the same or equivalent components are indicated by the same reference numerals or characters.

First Embodiment

A temperature sensor 1A according to a first embodiment of the invention is described with reference to FIGS. 1 to 4. As shown in FIGS. 1 to 4, the temperature sensor 1A includes a thermo-sensitive element 2 whose electrical characteristic varies depending on the ambient temperature, a pair of electrode wires 3 connected to the thermo-sensitive element 2, a pair of signal wires 4 overlapped and connected to the electrode wires 3, and a sheath pin 5 accommodating the signal wires 4 in a state where the signal wires 4 are exposed at their front ends.

The electrode wire 3 is made of a metal material consists primarily of Pt. The signal wire 4 is made of a meta material containing Al and having a linear thermal expansion coefficient larger than that of the metal material of the electrode wire 3. More specifically, in this embodiment, the electrode wire 3 is made of a Pt-alloy containing 10 mass % of iridium and having a linear thermal expansion coefficient of $9.88 \times 10^{-6}$ (1/° C.) at 1000° C. The electrode wire 4 is made of INCONEL601 (Ni-based alloy containing 1.4 mass % of Al) and having a linear thermal expansion coefficient of $17.7 \times 10^{-6}$ (1/° C.) at 1000° C. Both the electrode wire 3 and the signal wire 4 have an approximately circular cross-section. The diameter of the electrode wire 3 is 0.25 mm. The diameter of the signal wire 4 is 0.35 mm.

A junction part 6 is present in an overlap portion between the electrode wire 3 and the signal wire 4. The junction part 6 is formed by partially melting and thereafter coagulating the electrode wire 3 and the signal wire 4. The junction part 6 is formed with a first oxide film 61 containing Al at its surface.

Next, the temperature sensor 1A according to this embodiment is explained in more detail. The temperature sensor 1A is used for detecting the temperature of exhaust gas of an automobile. The use range of the temperature sensor 1A is from a low temperature of about −40° C. to a high temperature of about 1000° C.

The thermo-sensitive element 2 is made of a thermistor element whose electrical resistance varies depending on the ambient temperature. The thermo-sensitive element 2 has an approximately rectangular shape. The front end of one of the electrode wires 3 is joined to one of the surfaces of the thermo-sensitive element 2, and the front end of the other electrode wire 3 is joined to the other surface of the thermo-sensitive element 2. That is, the thermo-sensitive element 2 is disposed between the two electrode wires 3. The distance between the axial centers of the two electrode wires 3 is smaller than that of the two signal wires 4. A certain area of the rear end of each of the two electrode wires 2 extending from the thermo-sensitive element 2 as an overlap area 33 is overlapped with a corresponding one of the signal wires 4 to constitute part of the junction part 6. The thermo-sensitive element 2 is sealed by a glass 11 together with the front ends of the two electrode wires 3.

The two signal wires 4 extend from inside the sheath pin 5. Each signal wire 4 includes a held area 42 held by the sheath pin 5, an overlap area 43 which is overlapped with a corresponding one of the electrode wires 43 to constitute part of the junction part 6, and a bent portion 44 connecting the hold area 42 and the overlap area 43. The plane including the center axes of the two signal wires 4 outside the overlap areas 43 is closer to the plane including the center axes of the two electrode wires 3 than the plane including the center axes of the signal wires 4 inside the overlap areas 43.

Figure 3:
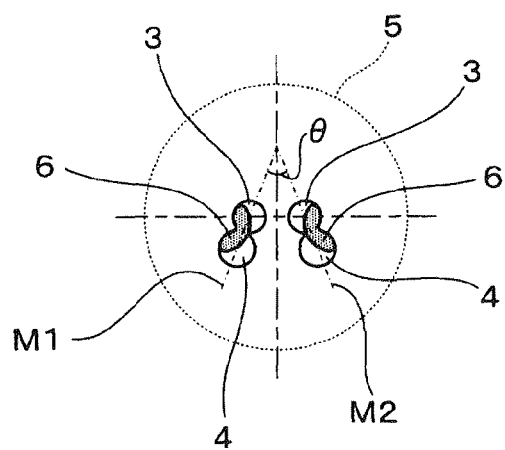
FIG. 3 is a cross-sectional view of FIG. 2 taken along line III-III.

An overlap portion 34 of the electrode wire 3 and the signal wire 4 is constituted by overlapping the overlap area 33 of the electrode wire 3 with the overlap area 43 of the signal wire 3 such that the electrode wire 3 is axially parallel to and in contact with the signal wire 4. As shown in FIG. 3, a straight line M1 joining the axial centers of one of the two electrode wires 3 and a corresponding one of the two signal wires 4 overlapped with each other is not parallel to a straight line M2 joining the axial centers of the other electrode wire 3 and the other signal wire 4 overlapped with each other. In this embodiment, the angle θ between the straight lines M1 and M2 is 45 degrees.

The junction part 6 is formed by partially melting by laser welding, and thereafter coagulating the electrode wire 3 and the signal wire 4. The junction part 6, which is disposed stretching between the electrode wire 3 and the signal wire 4, consists of a mixture of the PT-alloy as the material of the electrode wire 3 and the INCONEL601 (Ni-based alloy containing 1.4 mass % of Al) as the material of signal wire 4. Accordingly, the linear thermal expansion coefficient of the junction part 6 is in between those of the electrode wirer 3 and the signal wire 4. In this embodiment, the junction part 6 is made up of two junction portions 60 which are approximately circular when viewed from the outside and joined to each other at their edges.

The first oxide film 61 is formed as a result of oxidation of the Al component contained in INCONEL601 as the material of the signal wire 4 at the time of forming the junction part 6 by laser welding. In this embodiment, the first oxide film 61 contains 90 mass % or more of $Al_2O_3$. The first oxide film 61 covers the surface of the junction part 6 substantially uniformly.

In this embodiment, the laser welding is performed in an atmosphere supplied with nitrogen gas as an assist gas along a direction perpendicular to the straight line joining the axial centers of the two signal wires 4 from the side of the signal wires 4 such that a laser beam emitted from a laser welding apparatus is applied to a contact portion between the signal wire 4 and the electrode wire 3 in the overlap portion 34 from a direction parallel to the straight line joining the axial centers of the two signal wires 4. The focal position of the laser beam is at the contact portion. The spot diameter of the laser beam is 0.4 mm. The power of the laser beam is 0.5 kW.

Figure 4:
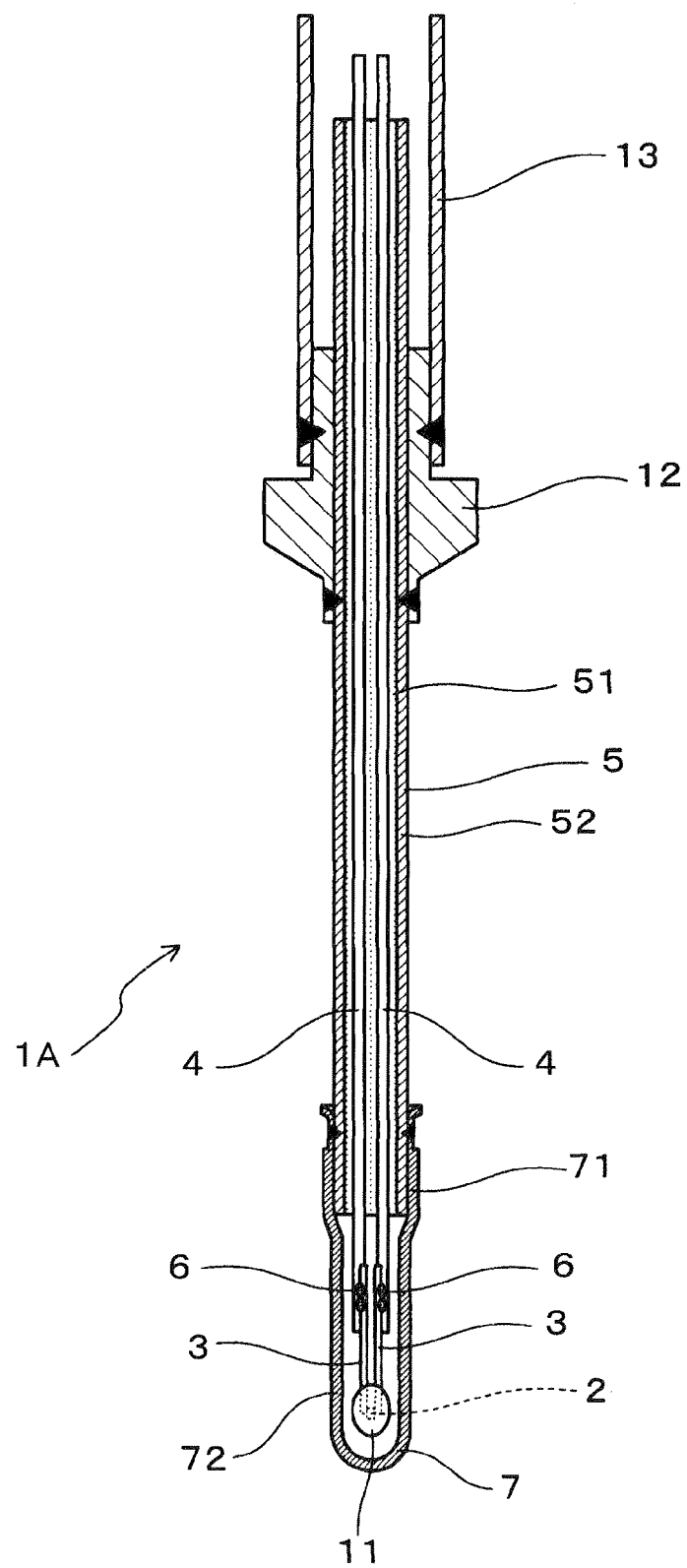
FIG. 4 is a longitudinal cross-sectional view of the temperature sensor according to the first embodiment of the invention.

As shown in FIG. 4, the sheath pin 5 includes the pair of the signal wires 4, an insulating part 51 made of insulating powder such as magnesia powder and disposed around the signal wires 4, and an outer tube part 52. The overlap area 43, the bent portion 44 and the held area 42 of each signal wire 4 are exposed from the outer tube part 52 of the sheath pin 5. A rib 12 holding the sheath pin 5 is fixed to the outer periphery of the outer tube part 52. A protection tube 13 for protecting the sheath pin 5 and leads (not shown) connected to the rear end of the sheath pin is fixed to the rear end of the rib 12 by full-circled welding. The outer tube part 52, the rib 12 and the protection tube 13 are made of SUS310S, SUS304 and SUS304, respectively.

A cover 7 is fitted and welded to the outer periphery of the front end portion of the sheath pin 5. The cover 7 includes a large-diameter portion 71 fitted to the sheath pin 5 and a small-diameter portion 72 located around the thermo-sensitive element 2 and the exposed parts of the electrode wires 3 and the signal wires 4. The front end of the small-diameter portion 72 is closed in an approximately hemisphere shape. The cover 7 is made of INCONEL601.

Next, the advantages of the temperature sensor 1A described above are explained. The temperature sensor 1A includes the electrode wires 3 made of the Pt-alloy and the signal wires 4 made of INCONEL601 which is a Ni-based alloy containing Al and having a linear thermal expansion coefficient larger than that of the Pt-alloy. In the overlap portion 34 between the electrode wire 3 and the signal wire 4, the junction part 6 formed by partially melting and thereafter coagulating the electrode wire 3 and the signal wire 4 is disposed. Since the junction part 6 is a mixture of the materials of the electrode wire 3 and the signal wire 4, the junction part 6 has a linear thermal expansion coefficient in between those of the electrode wire 3 and the signal wire 4. Further, the temperature sensor 1A includes the first oxide film 61 consisting primarily of $Al_2O_3$ formed on the surface of the junction part 6. This makes it possible to reduce the thermal stress which occurs due to the difference between the linear thermal expansion coefficients of the electrode wire 3 and the signal wire 4. Accordingly, it is possible to prevent the electrode wire 3 which is weaker in material strength than the signal wire 4 from breaking when the temperature sensor 1A is subjected to a hot and cold cycle ranging from the room temperature to a high temperature between 950° C. and 1000° C. Hence, the temperature sensor 1A of this embodiment can be advantageously used for detecting the temperature of exhaust gas of an automobile provided with a turbo charger.

In this embodiment, the first oxide film 61 consists primarily of $Al_2O_3$. Accordingly, the first oxide film 61 is robust and exhibits resistance to flaking off when subjected to a repetitive hot and cold cycle. This makes it possible to reduce the thermal stress applied to the junction part 6 to thereby further reliably prevent the electrode wire 3 from breaking.

In this embodiment, the signal wire 4 is made of the Ni-base alloy containing Al, and accordingly exhibits high resistance to oxidation. Accordingly, since the surface of the signal wire 4 is unlikely to be oxidized, and the cross-sectional area of the signal wire 4 is unlikely to reduce due to flaking off of the oxide film even when the temperature sensor 1A is subjected to a repetitive hot and cold cycle, it is possible to suppress occurrence of plastic deformation of the signal wire 4 due to reduction of its diameter. This makes it possible to reduce the thermal stress applied to the junction part 6 to thereby further reliably prevent the electrode wire 3 from breaking. Further, the temperature sensor 1A of this embodiment is highly manufacturable because workability of the sheath pin 5 is not impaired.

Second Embodiment

Figure 5:
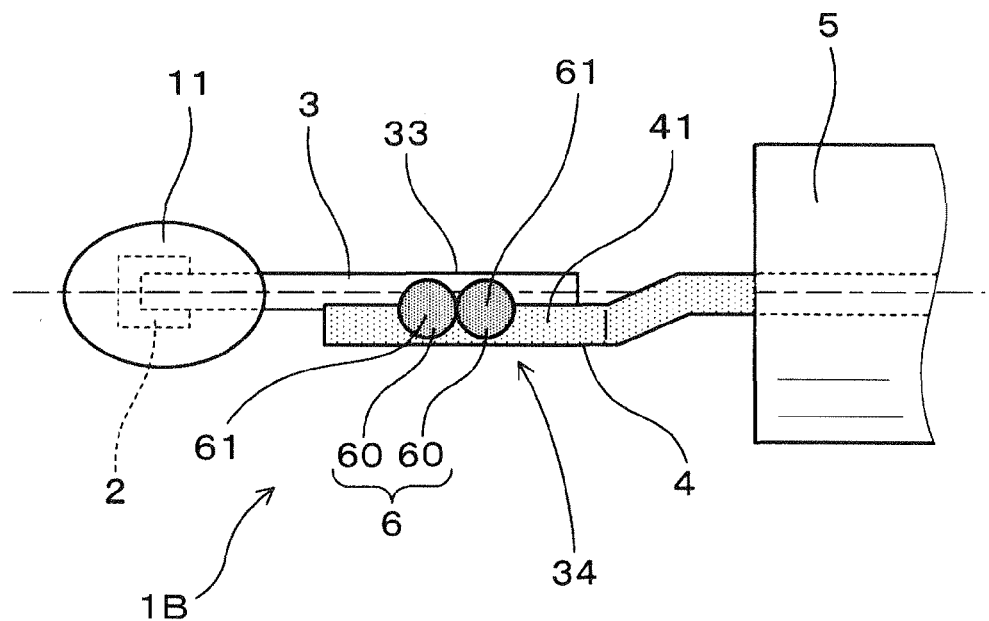
FIG. 5 is a side view of a front part of a temperature sensor according to a second embodiment of the invention.

Next, a temperature sensor 1B according to a second embodiment of the invention is described with reference to FIG. 5. As shown in FIG. 5, in the second embodiment, the signal wire 4 exposed from the sheath pin 5 is formed with a second oxide film 41 containing Al at its outer periphery. More specifically, substantially whole of the exposed part of the signal wire 4 is covered with the second oxide film 41. In this embodiment, the second oxide film 41 consists primarily of $Al_2O_3$. More specifically, the second oxide film 41 contains 90 mass or more of $Al_2O_3$. Except for the above, the temperature sensor 1B according to the second embodiment is the same as the temperature sensor 1A according to the first embodiment. The second oxide film 41 is formed by heat-treating the part of the signal wire 4 exposed from the sheath pin 5 at a temperature of 900° C. after the junction part 6 is formed.

Accordingly, since the signal wire 4 is initially provided with the second oxide film 41 at its outer periphery, the signal wire 4 exhibits still higher resistance to oxidation. Hence, it is possible to suppress occurrence of plastic deformation of the signal wire 4 due to reduction of its diameter even when the temperature sensor 1B is subjected to a repetitive hot and cold cycle. This makes it possible to reduce the thermal stress applied to the junction part 6 to thereby further reliably prevent the electrode wire 3 from breaking. The second oxide film 41 consisting primarily of $Al_2O_3$ is robust, and accordingly the above described advantages can be reliably obtained.

Third Embodiment

Figure 6:
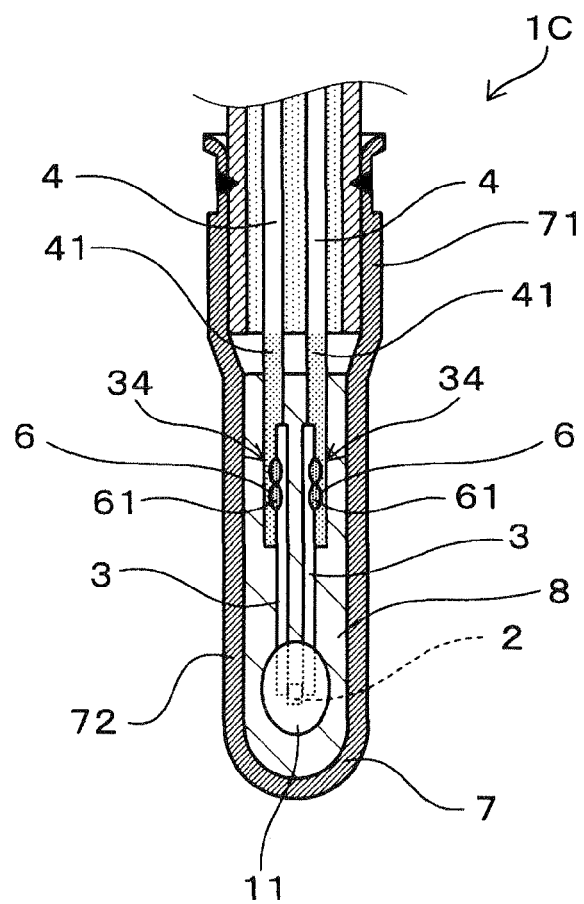
FIG. 6 is a side view of a front part of a temperature sensor according to a third embodiment of the invention.
Figure 7:
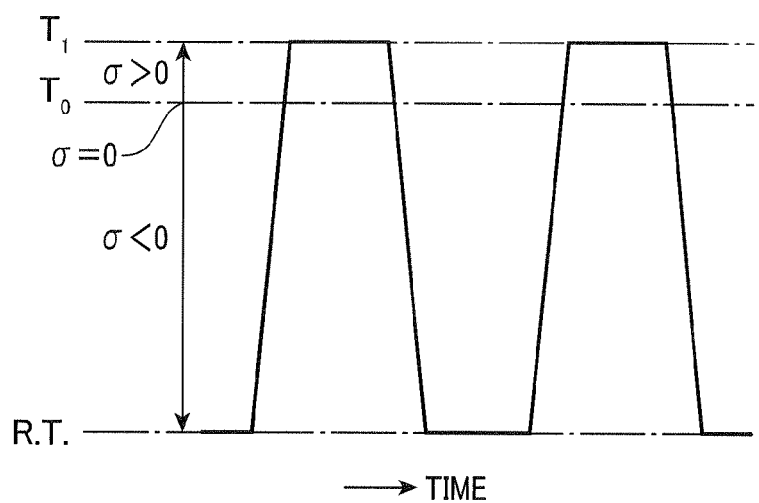
FIG. 7 is a diagram explaining how stress applied to a junction part of the temperature sensor according to the third embodiment of the invention is affected by the temperature difference between a hot state and a cold state when the temperature sensor is subjected to the hot and cold cycle.

Next, a temperature sensor 1C according to a third embodiment of the invention is described with reference to FIGS. 6 to 9. In the third embodiment, a filler 8 is filled in the cover 7 as shown in FIG. 6. More specifically, the filler 8 fills inside the small-diameter portion 72 of the cover 7 substantially completely. The electrode wires 3, the signal wires 4 and the cover 7 are fixed by the filler 8. In this embodiment, the filler 8 consists primarily of $Al_2O_3$ and has a linear thermal expansion coefficient of approximately $8 \times 10^{-6}$ (1/° C.) at 1000° C. The electrode wires 8, the signal wires 4 and the filler 8 are fixed to one another. The filler 8 and the cover 8 are also fixed to each other. Except for the above, the temperature sensor 1C according to the third embodiment has the same structure as the temperature sensor 1B according to the second embodiment.

The filler 8 to be filled in the cover 8 is manufactured in the following way. First, a slurry filler material is put in the cover 7. The filler material contains $Al_2O_3$ powder, glass powder and a dispersing agent, and prepared so that the moisture content of the whole slurry is 19 mass %. The dispersing agent is added by an amount of 1 mass % of these powders. The overlap portion 34 formed with the junction part 6 is inserted into the filler material in the cover 7 from the side of the thermo-sensitive element 2. Thereafter, the filler material is heat-treated atmospherically at 900° C. to be completed as the filler 8. The second oxide film 41 is formed in the outer periphery of the signal wire 4 at the time of forming the filler 8.

In forming the second oxide film 41, the cover 7 located at the outermost periphery is heated first and then cooled first. On the other hand, the electrode wires 3 and the signal wires 4 located inside the cover 7 are hard to be heated and hard to be cooled after being heated compared to the cover 7, and also are restrained by the filler 8. Accordingly, the thermal stress applied to the junction part 6 is likely to increase compared to when the filler 8 is not present. The temperature sensor 1C of this embodiment is resistant to breakage of the electrode wire under the above severe thermal stress conditions. Next, this mechanism is explained in more detail with reference to an example shown in FIGS. 7 to 9.

It is assumed that the temperature when the filler 8 has hardened is $T_0$ (900° C. in this example), and the stress $\sigma$ applied to the junction part 6 at the temperature of $T_0$ is 0. The temperature sensor 1C is subjected to a repetitive hot and cold cycle ranging from the room temperature RT to a high temperature $T_1$ (950° C. in this example) higher than $T_0$. In this example, the condition of the linear thermal expansion coefficient of the filler 8 < the linear thermal expansion coefficient of the electrode wire 3 < the linear thermal expansion coefficient of the junction part 6 < the linear thermal expansion coefficients of the signal wire 4 and the cover 8 is satisfied.

Figure 8:
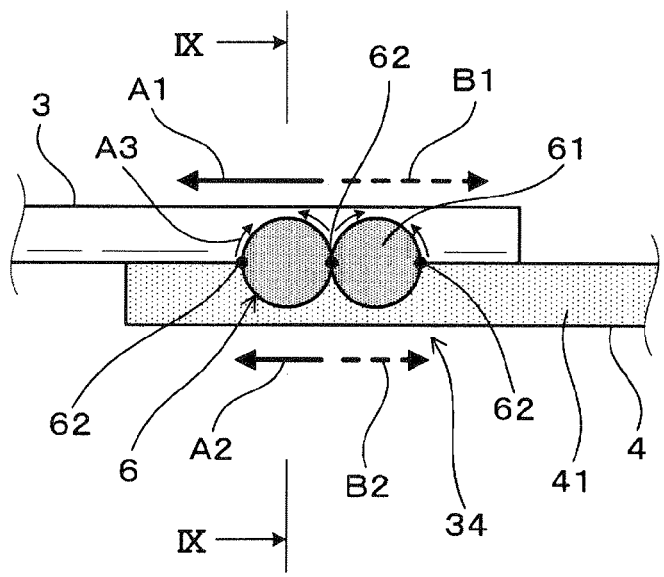
FIG. 8 is an enlarged view schematically showing the junction part and its vicinity of the temperature sensor according to the third embodiment of the invention.
Figure 9:
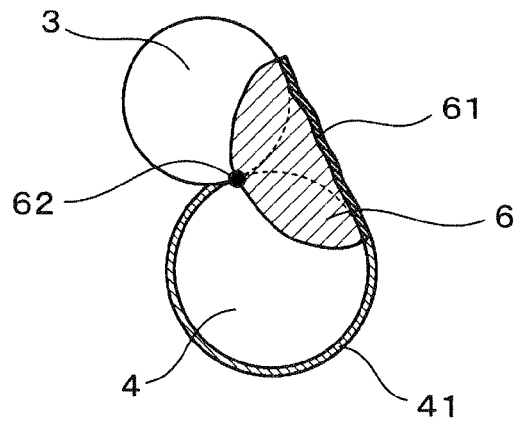
FIG. 9 is a cross-sectional view of FIG. 8 taken along line IX-IX.

The behavior of the temperature sensor 1C during temperature change from $T_0$ to $T_1$ is as follows. The cover 7 located at the outermost periphery is heated first, and expands. As a result, the thermo-sensitive element 2 and the electrode wires 3 connected to the thermo-sensitive element 2 are pulled. Accordingly, as shown in FIGS. 8 and 9, a cutout portion 62 of the junction part 6 at which the electrode wire 3 and the signal wire 4 overlap with each other is applied with a tensile stress in the direction shown by the arrow A1. Although the inside of the cover 7 is harder to be heated than the cover 7 itself, it is heated to some extent. Accordingly, the signal wire 4 also expands although less than the cover 7. Accordingly, the cutout portion 62 is applied with a tensile stress in the direction shown by the arrow A2. As a result, the cutout portion 62 undergoes the tensile stress equal to the difference between the tensile stresses shown by the arrows A1 and A2. The cutout portion 62 is applied with also a stress in the direction shown by the arrow A3 to open the cutout portion 62 along the junction part 6. This is because the electrode wire 3 is stretched by the cover 7 having the large linear thermal expansion coefficient due to the difference between the linear thermal expansion coefficients of the electrode wire 3 and the signal wire 4, and in addition, the presence of the filler 8.

The behavior of the temperature sensor 1C during temperature change from $T_0$ to RT is as follows. The cover 7 located at the outermost periphery is cooled first, and contracts greatly. As a result, the thermo-sensitive element 2 and the electrode wire 3 connected to the thermo-sensitive element 2 are compressed. Accordingly, the cutout portion 62 is applied with a compressive stress in the direction shown by the arrow B1. Although the inside of the cover 7 is harder to be cooled than the cover 7 itself, it retains heat therein to some extent. Accordingly, the signal wire 4 contracts to some extent although not immediately. Accordingly, the cutout portion 62 is applied with a compressive stress in the direction shown by the arrow B2. As a result, the cutout portion 62 is subjected to the compressive stress (shear stress) equal to the difference between the compressive stresses shown by the arrows B1 and B2.

Therefore, when the hot and cold cycle ranging between the room temperature RT and the high temperature $T_1$ is repeated, the cutout portion 62 is subjected to a severe thermal condition because the tensile stress and the compressive stress are applied alternately.

Even in such a condition, the junction part 6 of the temperature sensor 1C of this embodiment can be prevented from being applied with an excessively large thermal stress because the first oxide film 61 consisting primarily of $Al_2O_3$ is formed on the surface of the junction part 6. Further, since the outer periphery of the signal wire 4 exposed from the sheath pin 5 is coated with the second oxide film 41 consisting primarily of $Al_2O_3$, and the second oxide film 41 is resistant to flaking off even when the hot and cold cycle is repeated, it is possible to suppress plastic deformation of the signal wire 4 due to reduction of its diameter 4 and accordingly suppress the thermal stress applied to the junction part 6. Hence, the temperature sensor 1C of this embodiment can prevent its electrode wires 3 from breaking even under the above described sever thermal conditions.

Incidentally, in the third embodiment, the material of the signal wire 4 is the same as the cover 7, and accordingly the linear thermal expansion coefficient of the electrode of the signal wire 4 is the same as the cover 7. However, the above described advantages can be obtained also in a case where the linear thermal expansion coefficient of the signal wire 4 is smaller than that of the cover 7, or the linear thermal expansion coefficient of the cover 7 is smaller than that of the signal wire 4.

Experimental Example 1

Experimental example 1 shows comparison in the initial state and the state after an endurance test between a sample of a conventional temperature sensor 91 and a sample of the temperature sensor 1 of the invention. The endurance test was performed in a condition (referred to as "endurance condition 1" hereinafter) that a cycle in which the ambient temperature of these temperature sensors is increased from room temperature to a highest temperature of 950° C., and then decreased to room temperature is repeated 5,000 times.

The sample of the temperature sensor 1 of the invention has basically the same structure as the foregoing temperature sensor 1C according to the third embodiment. However, in this sample of the temperature sensor 1 of the invention, the electrode wires 3 and the signal wires 4 are not completely fixed to the filler 8. Unlike the signal wires 4 of the sample of the temperature sensor 1 of the invention, the signal wires 94 of the sample of the conventional temperature sensor 91 are made of SUS310S. Accordingly, the junction part 96 of the sample of the conventional temperature sensor 91 is a mixture of a Pt-alloy and SUS310S, and is not formed with the first oxide film 61 consisting primarily of $Al_2O_3$ at its surface. Further, the signal wire 94 is not formed with the second oxide film 41 consisting primarily of $Al_2O_3$ at its surface.

Figure 10:
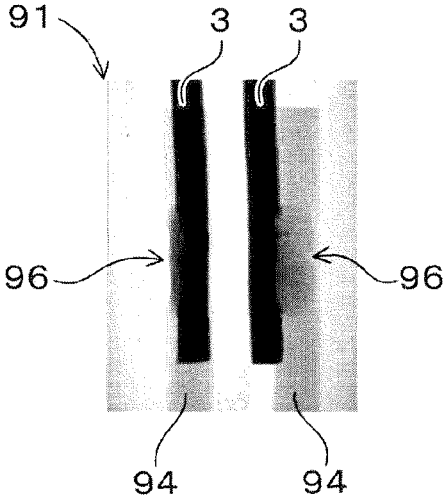
FIG. 10 is a diagram explaining results of an endurance test performed as experimental example 1 on a sample of a conventional temperature sensor.
Figure 10:
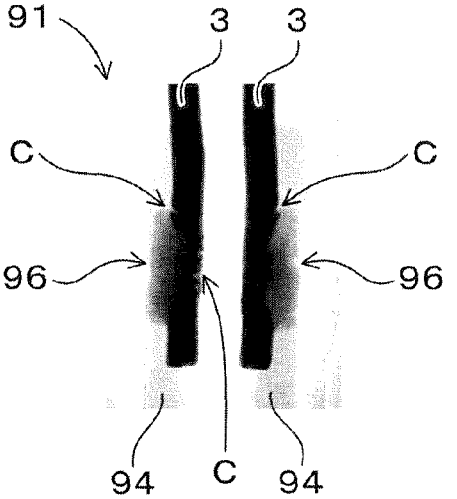
Figure 10:
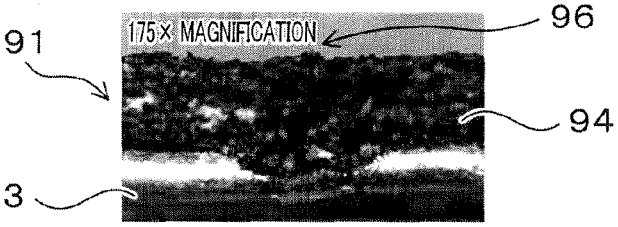
Figure 10:
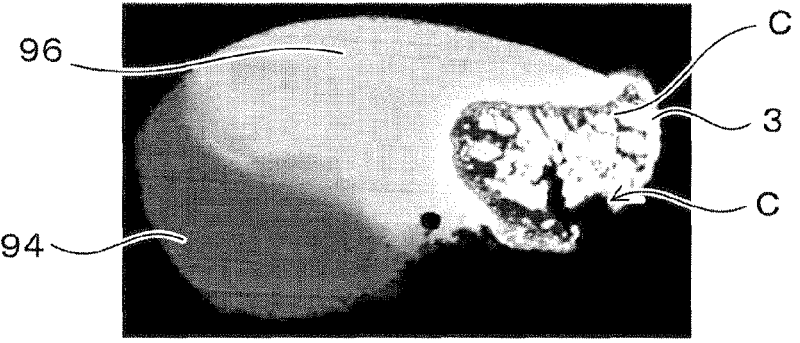

FIG. 10 shows results of the endurance test of the sample of the conventional temperature sensor 91. In section (a) of FIG. 10, there are shown X-ray photographs of the initial state and the state after the endurance test. From these X-ray photographs, it can be found that cracks C have occurred in each electrode wire 3 in the vicinity of the junction part 96 after the endurance test. It can be also found that the edges of the signal wires 94 have been rounded. In section (b) of FIG. 10, there is shown a photograph of the appearance of part of the sample disassembled after the endurance test. By disassembling the sample, it was found that the surfaces of the junction part 96 and the signal wires 4 were oxidized remarkably. From the above results, it can be concluded that rounding of the edges of the signal wires 94 is caused by reduction of the diameter of the signal wires 94 due to flaking off of the oxide film formed on the surfaces of the signal wires 94. In section (c) of FIG. 10, there is shown a photograph of the cross section of part of the sample including the junction part 96 after the endurance test. Form this photograph, it can be found that many cracks C have occurred in the electrode wire 3 which is weaker in material strength than the signal wire 94.

Figure 11:
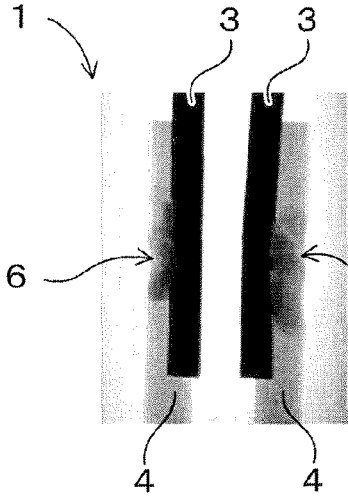
FIG. 11 is a diagram explaining results of an endurance test performed as experimental example 1 on a sample of a temperature sensor of the invention.

FIG. 11 shows results of the endurance test of the sample of the temperature sensor 1 of the invention. In section (a) of FIG. 11, there are shown X-ray photographs of the initial state and the state after the endurance test. From these photographs, it can be found that no crack has occurred in the electrode wire 3 in the vicinity of the junction part 6 after the endurance test, and there is no significant change in the signal wire 4 after the endurance test. In section (b) of FIG. 11, there is shown a photograph of appearance of part of the sample disassembled after the endurance test. By disassembling the sample, it was found that, unlike the sample of the conventional temperature sensor 91, any remarkable oxidation of the surface of the junction part or the signal wire was not found, and any reduction of the diameter of the signal wire due to flaking off of the oxidation film was not recognized at all in this sample. This is because of the robust first and second oxide films 61 and 41 formed on the surface of the junction part 6 and the surface of the signal wire 4, respectively. In section (c) of FIG. 11, there is shown a photograph of the cross section of part of the sample including the junction part 6. From this photograph, it can be found that although the electrode wire 3 is weaker in material strength than the signal wire 4, no crack has occurred in the electrode wire 3 after being subjected to the repetitive hot and cold cycle. This is because that the thermal stress applied to the junction part 61 can be further reduced by the provision of the first oxide film 61, and by the provision of the second oxide film 41 resistant to flaking off to suppress plastic deformation due to reduction of the diameter of the signal wire.

Experimental Example 2

Experimental example 2 shows comparison in the initial state and the states after each of two different endurance tests between the sheath pins 95 of a sample of the conventional temperature sensor 91 and the sheath pins 5 of a sample of the temperature sensor 1 of the invention. The endurance tests were performed in the foregoing endurance condition 1 and a condition which is the same as the endurance condition 1 except for that the highest temperature is 1000° C. This condition is referred to as "endurance condition 2" hereinafter. The sheath pin 5 and 95 of the samples in experimental example 2 are the same as those of the samples used in experimental example 1.

Figure 12:
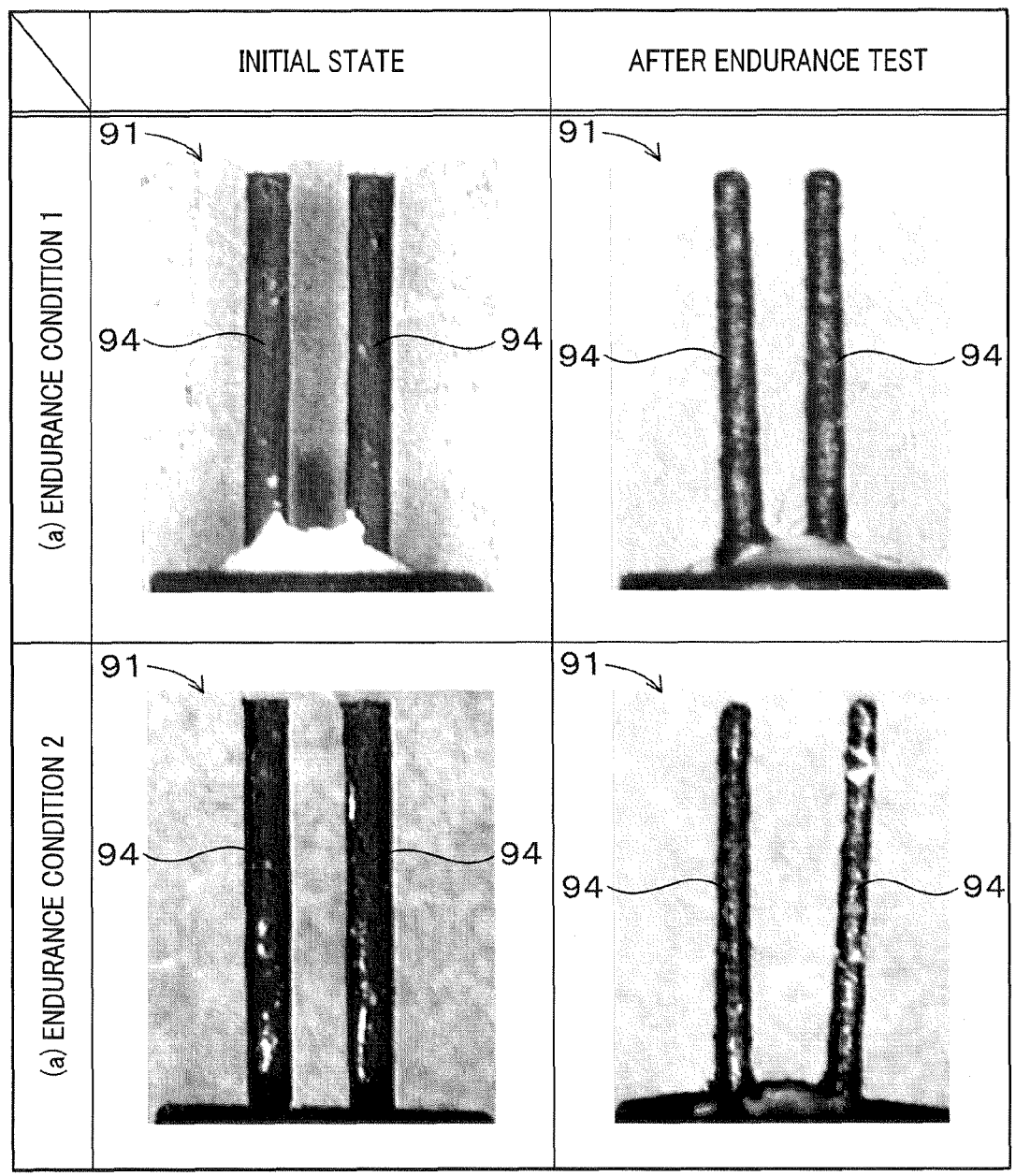
FIG. 12 is a diagram explaining results of an endurance test performed as experimental example 2 on a sheath pin of a sample of the conventional temperature sensor.

FIG. 12 shows results of endurance test 2 of the sheath pin 95 of the sample of the conventional temperature sensor 91. Section (a) of FIG. 12 shows photographs of the sheath pin 95 in the initial state and the state after the endurance test performed in endurance condition 1. From these photographs, it is found that the cross-sectional area of the signal wire 94 has reduced by about 15% after endurance test performed in endurance condition 1. Section (b) of FIG. 12 shows photographs of the sheath pin 95 in the initial state and the state after the endurance test performed in endurance condition 2. From these photographs, it is found that the cross-sectional area of the signal wire 94 has reduced by about 35% after endurance test performed in endurance condition 2. These are because the signal wire 4 is low in resistance to oxidation, and accordingly the surface of the signal wire 94 has been oxidized remarkably and the weak oxide film has been flaked off due to repetition of the hot and cold cycle. From the above results, it can be concluded that the conventional temperature sensor including the sheath pin 95 is disadvantageous in preventing the electrode wire from breaking because the signal wire 4 is likely to deform plastically due to strength reduction caused by reduction of the diameter of the signal wire, which causes the thermal stress applied to the junction part 96 to increase. On the other hand, although not shown in the drawings, no such reduction of the diameter was recognized in the signal wire 4 of the sample of the temperature sensor of the invention including the sheath pin 5. As apparent from the above described results, the signal wire 4 made of a Ni-based alloy containing Al such as INCONEL601 is less plastic-deformed, suppressing the thermal stress applied to the junction part 6. Accordingly, it can be concluded that using such material is advantageous to prevent breakage of the electrode wire 3.

Experimental Example 3

Experimental example 3 shows comparison in the initial state and the states after each of three different endurance tests between a sample the conventional temperature sensor 91 and a sample of the temperature sensor 1 of the invention. Further, the endurance tests were performed in the foregoing endurance condition 1, the foregoing endurance condition 2, a condition which is the same as the endurance condition 1 except for that the number of the cycles performed is 14,000 (this condition being referred to as "endurance condition 3" hereinafter), and a condition which is the same as the endurance condition 1 except for that the highest temperature is 1000° C. and the number of the cycles performed is 6,000 (this condition being referred to as "endurance condition 4"

hereinafter) The sample of the temperature sensor 1 of the invention and the sample of the conventional temperature 91 used in experimental example 3 are the same as those used in experimental example 1.

Figure 13:
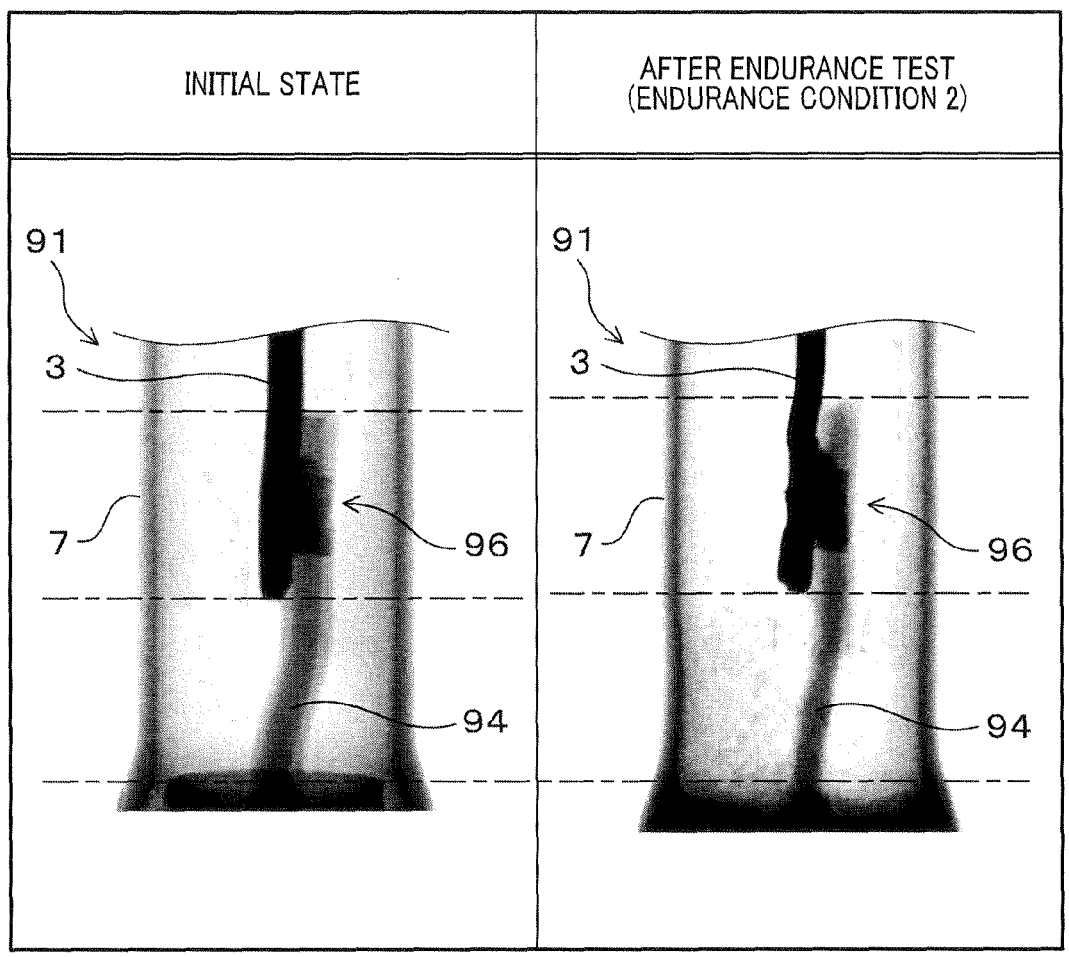
FIG. 13 is a diagram explaining results of an endurance test performed as experimental example 3 on a sample of a conventional temperature sensor.
Figure 14:
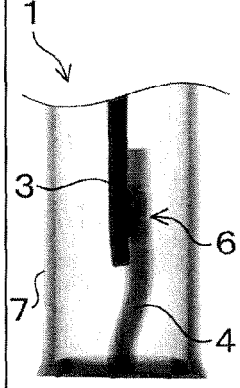
FIG. 14 is a diagram explaining results of an endurance test performed as experimental example 3 on a sample of a temperature sensor of the invention.

FIG. 13 is X-ray photographs showing results of the endurance test in endurance condition 2 of the sample of the conventional temperature sensor 91. From theses photographs, it can be found that the diameter of the signal wire 94 of the sample of the conventional temperature sensor 91 has been reduced, causing plastic deformation. It was also found that the electrode wire 3 has been bent. This means that the junction part 6 was applied with a large compressive stress. FIG. 14 shows X-ray photographs showing results of the endurance tests in endurance condition 3 and endurance condition 4 of the sample of the temperature sensor 1 of the invention. From these photographs, it can be found that plastic deformation and bending of the electrode wire 3 due to reduction of the diameter of the signal wire 4 were very small, and no crack has occurred in the junction part 6. Hence, it can be concluded that the electrode wires 3 of the sample of the temperature sensor 1 of the invention are highly resistant to breakage.

It is a matter of course that various modification can be made to the above embodiments of the invention without departing from the spirit and scope of the invention, which is defined by the accompanying claims.

The above explained preferred embodiments are exemplary of the invention of the present application which is described solely by the claims appended below. It should be understood that modifications of the preferred embodiments may be made as would occur to one of skill in the art.

What is claimed is:

1. A temperature sensor comprising:
    a thermo-sensitive element whose electrical characteristics vary depending on temperature;
    a pair of electrode wires electrically connected to the thermo-sensitive element; and
    a sheath pin including a pair of signal wires which are overlapped with and connected to the pair of the electrode wires respectively, and accommodated in a state of being exposed to a front side of the temperature sensor on which the thermo-sensitive element is disposed;
    wherein
    the electrode wires are made of a metal material consisting primarily of Pt,
    the signal wires are made of a Ni-based alloy containing 1.0 to 1.7 mass % of Al and having a linear thermal expansion coefficient larger than a linear thermal expansion coefficient of the metal material forming the electrode wires,
    a junction part is present in an overlap portion of the electrode wires and the signal wires, the junction part being formed by partially melting and thereafter coagulating the electrode wires and the signal wires,
    the junction part includes a first oxidation film containing Al and having a thickness in a range of 1 to 50 µm at a surface thereof, and
    the signal wires are coated with a second oxidation film containing Al at an outer periphery thereof, such that the second oxide film is formed on the outer periphery of the signal wire.

2. The temperature sensor according to claim 1, further comprising a cover that is formed in a front end portion of the sheath pin and covers the thermo-sensitive element and outer peripheries of the electrode wires and the signal wires, and a filler filled in the cover,
    the electrode wires, the signal wires and the cover being fixed through the filler.

3. The temperature sensor according to claim 2, wherein the filler consists primarily of $Al_2O_3$.

4. The temperature sensor according to claim 1, wherein the first oxidation film consists primarily of $Al_2O_3$.

5. The temperature sensor according to claim 1, wherein the second oxidation film consists primarily of $Al_2O_3$.

* * * * *